(12) United States Patent
Nakata

(10) Patent No.: US 9,041,953 B2
(45) Date of Patent: May 26, 2015

(54) IMAGE FORMING APPARATUS, CHARGING MANAGEMENT DEVICE AND NON-TRANSITORY COMPUTER-READABLE RECORDING MEDIUM

(71) Applicant: Konica Minolta, Inc., Chiyoda-ku (JP)

(72) Inventor: Masaki Nakata, Fuchu (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/449,704

(22) Filed: Aug. 1, 2014

(65) Prior Publication Data
US 2015/0043027 A1 Feb. 12, 2015

(30) Foreign Application Priority Data
Aug. 6, 2013 (JP) .................................. 2013-163330

(51) Int. Cl.
G06K 15/00 (2006.01)
G06Q 20/14 (2012.01)
(52) U.S. Cl.
CPC ............ *G06K 15/406* (2013.01); *G06Q 20/145* (2013.01)

(58) Field of Classification Search
CPC G06K 15/406; G06Q 20/145; G03G 15/5004
USPC ............. 358/1.13, 1.14, 1.15; 399/88, 70, 44, 399/79, 168, 87; 713/300, 320
See application file for complete search history.

(56) References Cited

U.S. PATENT DOCUMENTS
2008/0112721 A1* 5/2008 Ajiro ............................... 399/70

FOREIGN PATENT DOCUMENTS
JP 2000-272203 A 10/2000
JP 2008-191436 A 8/2008
JP 2010-167705 A 8/2010

* cited by examiner

Primary Examiner — Jacky X Zheng
(74) Attorney, Agent, or Firm — Buchanan Ingersoll & Rooney PC

(57) ABSTRACT

Disclosed is an image forming apparatus, including: a job input unit; a job execution unit; a job storing unit; a start-up cost calculation unit to calculate a start-up cost which is a cost for start-up of the image forming apparatus, when the job is input from the job input unit; a total sum calculation unit to calculate a total sum of investable amount of the input job and the stored jobs; a job control unit to instruct the job storing unit to store the input job in case that the total sum is less than the start-up cost, and instruct the job execution unit to collectively execute the input job and the stored jobs in case that the total sum is not less than the start-up cost; and a charging unit configured to allocate the start-up cost to the jobs, and charge the allocated start-up cost for each executed job.

20 Claims, 16 Drawing Sheets

| USER NAME | INVESTABLE AMOUNT (YEN) | TOTAL CHARGE AMOUNT (YEN) |
|---|---|---|
| A | 2 | 980.01 |
| B | 4 | 1240.58 |
| C | 6 | 2030.47 |
| D | 2 | 457.03 |
| E | 2 | 654.89 |

FIG.11

| JOB 4 (4 YEN) | | JOB 4 (4 YEN) |
| JOB 3 (2 YEN) | START-UP COST (10 YEN) | JOB 3 (2 YEN) |
| JOB 2 (2 YEN) | | JOB 2 (2 YEN) |
| JOB 1 (2 YEN) | | JOB 1 (2 YEN) |
| INVESTABLE AMOUNT | | ALLOTMENT |

FIG.14

| WAITING TIME Tw | 60- | 50-60 | 40-50 | 30-40 | 20-30 | 10-20 | 0-10 |
|---|---|---|---|---|---|---|---|
| RATIO E | 2.2 | 2.0 | 1.8 | 1.6 | 1.4 | 1.2 | 1 |

Total ratio = $1 \times Jt0 + 1.2 \times Jt1 + 1.4 \times Jt2 + \cdots + 2.2 \times Jt6$,
where $Jt0$ is the number of jobs in which the waiting time Tw is 0-10 minutes, $Jt1$ is the number of jobs in which the waiting time Tw is 10-20 minutes, ......, $Jt6$ is the number of jobs in which the waiting time Tw is 60- minutes.

When the number of jobs is m, the ratio E which is set to the waiting time Tw for execution of an arbitrary job n is $En$ and the refund ratio for the job n is $Kn$,
$Kn$ is calculated by using the equation: $En/(Total\ ratio)$.

When the investable amount of the job n is $Cn$ and the unit reduction amount is A,
A is calculated by using the equation: $A = Surplus/(C1 \times K1 + C2 \times K2 + \cdots + Cm \times Km)$.

Refund amount to job n is calculated by using the formula:
$Cn \times Kn \times A$.

FIG.15

| WAITING TIME Tw | 60~ | 50~60 | 40~50 | 30~40 | 20~30 | 10~20 | 0~10 |
|---|---|---|---|---|---|---|---|
| RATIO E | 2.2 | 2.0 | 1.8 | 1.6 | 1.4 | 1.2 | 1 |
| JOB | - | JOB 1 | - | JOB 2 | JOB 3 | - | JOB 4 |

Total ratio = 2.0 + 1.6 + 1.4 + 1 = 6

Refund ratio K1 = 2/6
Refund ratio K2 = 1.6/6
Refund ratio K3 = 1.4/6
Refund ratio K4 = 1/6

C1 = 2 yen
C2 = 2 yen
C3 = 2 yen
C4 = 8 yen

A = Surplus/(C1×(Refund ratio K1) + C2×(Refund ratio K2) + C3×(Refund ratio K3) + C4×(Refund ratio K4))
  = 4/(2×2/6 + 2×1.6/6 + 2×1.4/6 + 8×1/6) = 4/3 yen Refund amount to job 1 = 2×K1×A = 2×(2/6)×4/3 = 16/18 yen
Refund amount to job 2 = 2×K2×A = 2×(1.6/6)×4/3 = 12.8/18 yen
Refund amount to job 3 = 2×K3×A = 2×(1.4/6)×4/3 = 11.2/18 yen
Refund amount to job 4 = 8×K4×A = 8×(1/6)×4/3 = 32/18 yen Relating to start-up cost:
Start-up cost allocated to job 1 = 2 - 16/18 ≈ 1.111 yen
Start-up cost allocated to job 2 = 2 - 12.8/18 ≈ 1.289 yen
Start-up cost allocated to job 3 = 2 - 11.2/18 ≈ 1.378 yen
Start-up cost allocated to job 4 = 8 - 32/18 ≈ 6.222 yen

IMAGE FORMING APPARATUS, CHARGING MANAGEMENT DEVICE AND NON-TRANSITORY COMPUTER-READABLE RECORDING MEDIUM

BACKGROUND OF THE INVENTION

1. Field of the Invention

The present invention relates to an image forming apparatus and a charging management device which have a function of managing the cost required to execute a job, and a non-transitory computer-readable recording medium.

2. Description of Related Art

In an image forming apparatus, such as a copier, a multi-function peripheral, a printer and the like, the effort to save power has been performed. For example, in a short time from the completion of the execution of a job, a mode proceeds to a power saving mode, and power consumption which is caused during the standby time is reduced. Further, the execution of the job received in the power saving mode is suspended and the jobs are collectively executed at the time of recovering from the power saving mode to a normal state. As a result, the number of times of the start-up of the apparatus is reduced and the power consumption is reduced.

For example, in Japanese Patent Application Publication No. 2000-272203, the following printer apparatus is disclosed. In the printer apparatus, the priority of printing, such as 'normal' or 'urgent' is set to each job. In case that a job having the priority of 'urgent' is received in the power saving mode, the state of the apparatus is recovered from the power saving mode to the normal state to execute the job. In case that a job having the priority of 'normal' is received in the power saving mode, the execution of the job is suspended. Then, the state of the apparatus is recovered from the power saving mode at the predetermined timing or the like, and a plurality of suspended jobs are collectively executed. In this printer apparatus, the priority (normal or urgent) of the job is selected by a user.

In Japanese Patent Application Publication No. 2010-167705, the following image forming apparatus is disclosed. In the image forming apparatus, a user who instructs the apparatus to recover from a sleep mode (power saving mode) and to perform the printing, is informed that the subsequent collective printing can save the power more than the printing which is performed by recovering from the sleep mode. In this apparatus, by displaying the difference between the power consumption which is caused by recovering from the sleep mode and the power consumption which is caused by performing the subsequent collective printing, the user is informed that the subsequent collective printing can save more power.

In the other hand, in the image forming apparatus installed at an office or the like, a user is charged for the processing, such as the printing or the like. Further, the cost for the use of the image forming apparatus is managed in each user or in each section. The charging amount is calculated in accordance with the setting contents of each job, such as the setting of the number of sheets used for the printing, the setting of color/monochrome, the setting of the double-side printing or the single-side printing by which a printed matter is prepared, or the like.

Further, the following charging system is disclosed (for example, see Japanese Patent Application Publication No. 2008-191436). In the charging system, a user is charged for the setting contents of the job which can contribute to the energy saving, at low cost. On the other hand, a user is charged for the setting contents of the job which cannot contribute to the energy saving, at an extra fee according to the frequency of the above job. As a result, the user is motivated to cooperate in the power saving.

As described above, when the execution of the job input in the power saving mode is suspended and the jobs are collectively executed subsequently, the number of times of the start-up of the apparatus can be reduced and the amount of power consumption can be reduced. However, in case that the user can select whether the jobs are collectively executed subsequently or not like the technology disclosed in Japanese Patent Application Publication No. 2000-272203, the power saving effect cannot be improved without motivating the user to select that the jobs are collectively executed subsequently.

In the technology disclosed in Japanese Patent Application Publication No. 2010-167705, the apparatus displays the indication for informing the user that the subsequent collective printing can save more power. However, because the above indication is simply displayed, the performance of the subsequent collective printing depends on the user's good intention, eventually.

In the technology disclosed in Japanese Patent Application Publication No. 2008-191436, in case that the charging amount is reduced according to whether the setting contents of the jobs contribute to the power saving, the user can be motivated to cooperate in the power saving.

However, the charging amount is conventionally determined in accordance with the setting contents of each job and the cost for the start-up of the apparatus is not considered. Accordingly, the charging has not been influenced by the determination of whether the jobs are collectively executed subsequently or not.

SUMMARY

To achieve at least one of the abovementioned objects, an image forming apparatus reflecting one aspect of the present invention comprises:

a job input unit configured to receive an input of a job;

a job execution unit configured to execute the job;

a job storing unit configured to store the job of which execution is suspended;

a start-up cost calculation unit configured to calculate a start-up cost which is a cost for start-up of the image forming apparatus from a state in which the job is input to a state in which the job can be executed, when the job is input from the job input unit;

a total sum calculation unit configured to calculate a total sum of investable amount of the input job and one or more jobs stored in the job storing unit, which is spent for the start-up of the image forming apparatus;

a job control unit configured to instruct the job storing unit to store the input job in case that the total sum is less than the start-up cost, and instruct the job execution unit to collectively execute the input job and the jobs stored in the job storing unit in case that the total sum is not less than the start-up cost; and a charging unit configured to allocate the start-up cost to the jobs which are collectively executed, and charge the allocated start-up cost for each executed job.

Preferably, in case that a state of the image forming apparatus is changed, the start-up cost calculation unit calculates the start-up cost for the start-up of the image forming apparatus from the changed state to the state in which the job can be executed, and the total sum calculation unit calculates the total sum of the investable amount of the jobs stored in the job storing unit, which is spent for the start-up of the image forming apparatus; and in case that the start-up cost is not more than the total sum, the job control unit instructs the job execution unit to collectively execute the jobs stored in the job storing unit, and the charging unit allocates the start-up cost to the jobs which are collectively executed, and charges the allocated start-up cost for each executed job.

Preferably, a state of the image forming apparatus includes a state relating to power saving.

Preferably, a state of the image forming apparatus includes at least one of a temperature of the image forming apparatus and a humidity of the image forming apparatus.

Preferably, the job execution unit can execute a job for forming an image on a recording sheet, a state of the image forming apparatus includes a necessity of a calibration operation to be executed after the start-up, and the start-up cost includes a cost for the calibration operation which is executed after the start-up.

Preferably, the investable amount of each job, which is spent for the start-up is an amount set for each user or for each job.

Preferably, the charging unit determines an allotment of the start-up cost to each of the jobs which are collectively executed, by considering the set amount.

Preferably, the charging unit determines an allotment of the start-up cost to each of the jobs which are collectively executed, by considering a period in which the job is stored.

Preferably, in case that the start-up cost is more than the total sum, one or more solutions for setting the start-up cost so as to be not more than to the total sum, are proposed to a user and a selection of the solution to be adopted is received from the user.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 11 is an explanatory view showing an example of the situation in which the start-up cost is allocated to each job;

FIG. 14 is a view showing an example of the method for determining the refund amount;

FIG. 15 is a view showing an example of the calculation contents in case that the refund amount to each job shown in FIG. 12 is calculated.

DETAILED DESCRIPTION OF PREFERRED EMBODIMENT

Hereinafter, a preferred embodiment of the present invention will be explained with reference to the accompanying drawings. However, the scope of the invention is not limited to the illustrated examples.

Figure 1:
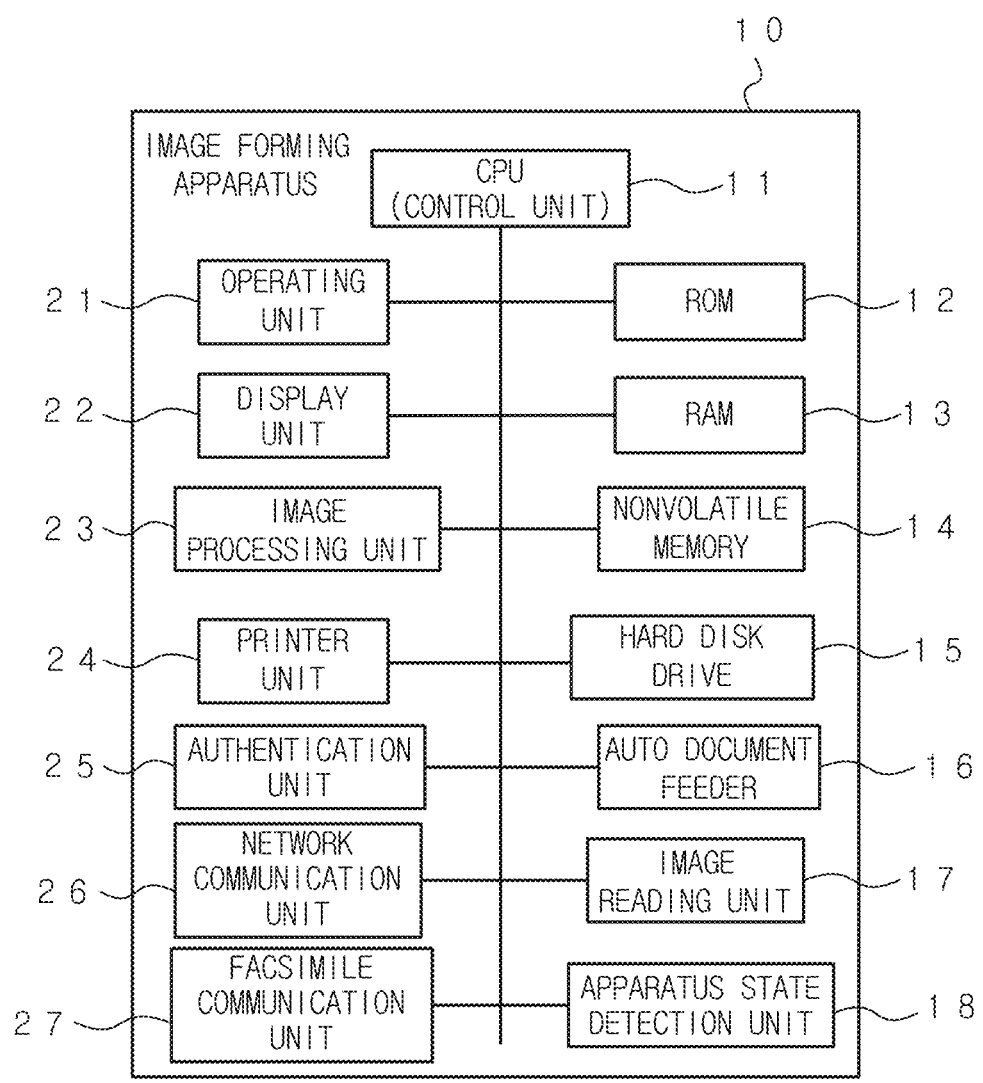
FIG. 1 is a block diagram showing a schematic configuration of the image forming apparatus according to the embodiment.

FIG. 1 shows a schematic configuration of the image forming apparatus 10 according to the embodiment. The image forming apparatus 10 is a so-called multi-function peripheral (MFP) having the copy function for printing an image on recording paper by optically reading an original, the scan function for obtaining image data by reading an original to store the image data as a file or to transmit the image data to an external terminal via a network, the printer function for printing out an image by forming the image on the recording paper in accordance with the print data received from a PC (Personal Computer) or the like via the network, the facsimile function for transmitting and receiving the image data in accordance with the facsimile protocol, and the like.

The image forming apparatus 10 comprises a CPU (Central Processing Unit) 11 as a control unit which totally controls the operations of the image forming apparatus 10. The CPU 11 is connected with a ROM (Read Only Memory) 12, a RAM (Random Access Memory) 13, a nonvolatile memory 14, a hard disk drive 15, an auto document feeder (ADF) 16, an image reading unit 17, an apparatus state detection unit 18, an operating unit 21, a display unit 22, an image processing unit 23, a printer unit 24, an authentication unit 25, a network communication unit 26, a facsimile communication unit 27, and the like via a bus.

By the CPU 11, a middleware, application programs, and the like are executed on an OS (Operating System) program as a base. In the ROM 12, various types of programs are stored. By carrying out various types of processes by the CPU 11 in accordance with these programs, each function of the image forming apparatus 10 is realized.

The RAM 13 is used as a work memory for temporarily storing various types of data when the CPU 11 executes the process in accordance with the programs, and as an image memory for storing image data, and the like.

The nonvolatile memory 14 is a memory (flash memory) in which the stored contents are not damaged even if the image forming apparatus 10 is turned off, and is used for storing various types of setting information, and the like.

The hard disk drive 15 is a large-capacity nonvolatile storing device. In the hard disk drive 15, various types of programs and data are stored in addition to print data, data relating to windows to be displayed, and the like. In the hard disk drive 15, jobs which are suspended from being executed are stored. In addition, in the hard disk drive 15, various information relating to the charging is stored. The hard disk drive 15 has a function as a job storing unit.

The image reading unit 17 has a function for optionally reading an original to obtain the image data. For example, the image reading unit 17 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 16 has a function of conveying the original by feeding the original set to the original setting tray from the top sheet one by one, passing the original through the reading position of the image reading unit 17 and discharging the original to a predetermined discharge position. The image reading unit 17 has a function of reading the original disposed on a platen glass and a function of sequentially reading the original conveyed by the auto document feeder 16.

The display unit 22 comprises a liquid crystal display (LCD), a driver thereof, and the like. On the display unit 22, various types of operation windows, setting windows, and the like are displayed. The operating unit 21 has a function of receiving various types of operations, such as input of jobs, from the user. The operating unit 21 has a function as a job input unit. The operating unit 21 comprises various types of hardware keys, such as a start button, and a touch panel provided on the display screen of the display unit 22. The touch panel detects the coordinate position on which the display screen of the display unit 22 is contacted by a touch pen, the user's finger or the like to operate the image forming apparatus 10.

The image processing unit 23 carries out the rasterization process for converting print data into image data, the compression/decompression process for the image data, and the like in addition to the processings, such as the enlargement/reduction and the rotation of image data.

The printer unit 24 has a function of forming an image on the recording paper in accordance with the image data. The printer unit 24 has a function as a job execution unit. In this embodiment, the printer unit 24 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by another type of printer.

Further, the fixing device used in the printer unit 24 fixes the toner by heating and pressing the recording paper. Accordingly, in order to start up the image forming apparatus 10 in the state in which the apparatus can perform the printing, it is required to raise the temperature of the fixing device to the temperature at which the toner can be fixed. The electric energy required to raise the temperature of the fixing device depends on the intended temperature to be raised, in addition to the initial temperature of the fixing device and the room temperature. For example, the intended temperature to be raised is determined in accordance with the thickness of the recording paper, and the like.

The authentication unit 25 authenticates the user who uses the image forming apparatus 10. The authenticating method may be an optional method, and in the method, a password, a fingerprint, a vein or the like may be used.

The network communication unit 26 has a function of communicating with an external device, such as a PC, a server, or the like, via a network, such as a LAN (Local Area Network) or the like.

The facsimile communication unit 27 has a function of transmitting and receiving the image data to/from an external device having the facsimile (FAX) function via a telephone line.

The apparatus state detection unit 18 detects the state of the image forming apparatus 10. The state of the apparatus includes various types of states which influence the calculation of the start-up cost. The state of the apparatus includes the power mode, the inner temperature, the inner humidity, the necessity of the calibration operation to be executed after the image forming apparatus 10 is started up to the normal state, and the like. The apparatus state detection unit 18 comprises a temperature sensor, a humidity sensor, and the like.

The image forming apparatus 10 has a function of charging a user for the executed job. The image forming apparatus 10 charges a user for each job so as to impose both of the job processing cost which is the charging amount based on the setting contents of each job (the setting of the number of sheets used for the printing, the setting of color/monochrome, and the like), and the start-up cost which is the cost for the start-up of the image forming apparatus 10.

Specifically, when the job is input, the image forming apparatus 10 calculates the start-up cost which is the cost for the start-up of the image forming apparatus 10 from the state in which the job is input to the state in which the job can be executed, and the total sum of the investable amount of the input job and the stored jobs, which is spent for the start-up of the image forming apparatus 10. In case that the total sum is less than the start-up cost, the execution of the input job is suspended and the job is stored. On the other hand, in case that the total sum is not less than the start-up cost, the input job and the stored jobs are collectively executed. Further, the start-up cost is allocated to each of the jobs which are collectively executed and is charged for each of the executed jobs. Further, for each of the jobs, a total of the allotment of the start-up cost to the job and the job processing cost for the job is charged.

The start-up cost of the image forming apparatus 10 varies according to the state of the apparatus at the time of the start-up, for example, the level of the power saving mode, the inner temperature of the apparatus, the elapsed time which elapses since the completion of the execution of the previous job, and the like. Therefore, in case that the start-up cost is charged for each job, the charging amount is determined in accordance with the state of the apparatus.

Figure 2:
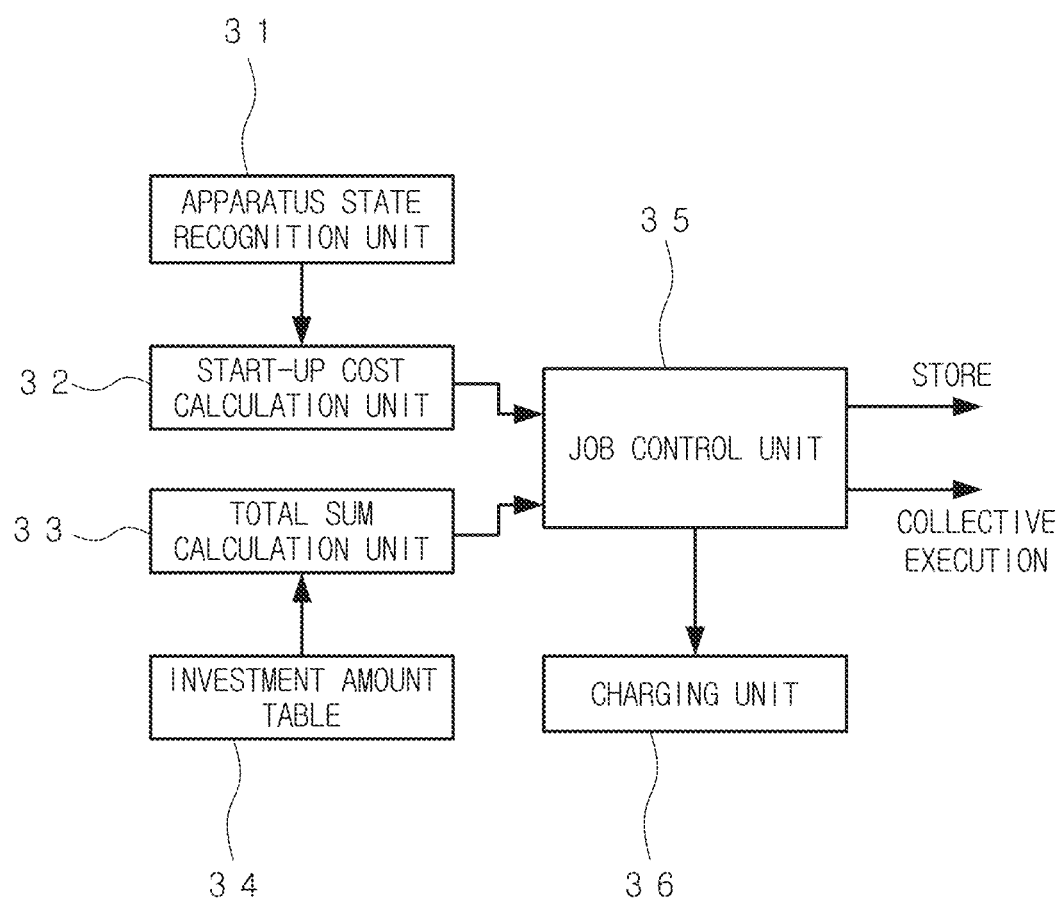
FIG. 2 is a view showing a functional configuration of the image forming apparatus, which relates to the operation for the suspension of the execution of a job and the collective execution of the jobs and which relates to the charging.

FIG. 2 shows a functional configuration of the image forming apparatus 10, which relates to the operation for the suspension of the execution of the job and the collective execution of the jobs and which relates to the charging. The image forming apparatus 10 has each function of an apparatus state recognition unit 31, a start-up cost calculation unit 32, a total sum calculation unit 33, an investment amount table 34, a job control unit 35 and a charging unit 36. For example, the investment amount table 34 is stored in the hard disk drive 15. When the CPU 11 executes the programs, each function of the apparatus state recognition unit 31, the start-up cost calculation unit 32, the total sum calculation unit 33, the job control unit 35 and the charging unit 36 are realized.

The apparatus state recognition unit 31 recognizes the state of the image forming apparatus 10. The state of the apparatus includes various types of states which influence the calculation of the start-up cost. The state of the apparatus includes the power mode, the inner temperature, the inner humidity, the necessity of the calibration operation to be executed after the image forming apparatus 10 is started up to the normal state, and the like. The inner temperature and the inner humidity are obtained from the apparatus state detection unit 18.

The power mode includes the power saving state, the print standby state and the job executable state. The power saving state is the standby state in which the power consumption is low as compared with the print standby state. The print standby state is the standby state in which the power consumption is low as compared with the job executable state.

The job executable state is the state in which the job can be executed immediately and the start-up of the image forming apparatus 10 is completed. The power saving state is the state in which the power supply to the most part of the image forming apparatus 10 is stopped. For example, the print standby state is the state in which the power is supplied to the CPU 11, the operating unit 21 and the display unit 22, and the temperature of the fixing device is maintained to a predetermined standby temperature which is lower than the temperature at which the printing can be performed.

The change of the power mode in the image forming apparatus 10 is performed as described below. When the execution of the job is completed in the job executable state, the image forming apparatus 10 immediately changes to the print standby state. In case that the conditions for executing the job are satisfied in the print standby state, the image forming apparatus 10 recovers to the job executable state and executes the jobs. In case that even if a given period of time elapses since the state of the apparatus changes to the print standby state, the conditions for executing the job are not satisfied, the image forming apparatus 10 changes to the power saving state. In case that the conditions for executing the job are satisfied in the power saving state, the image forming apparatus 10 recovers to the job executable state and executes the jobs.

The calibration operation is the test operation which is performed by the printer unit 24 in order to adjust image quality. Specifically, the calibration operation is the operation for performing the color adjustment and the like by forming a patch of a test pattern on an intermediate transfer belt, by optically reading the patch, and by adjusting the color of the read patch to an intended color.

When the job is input to the image forming apparatus 10, the start-up cost calculation unit 32 calculates the start-up cost which is the cost for the start-up of the image forming apparatus 10 to the job executable state from the state in which the job is input. Further, in case that the state of the apparatus is changed, the start-up cost calculation unit 32 calculates the start-up cost for the start-up of the image forming apparatus 10 to the job executable state from the changed state.

Figure 3:
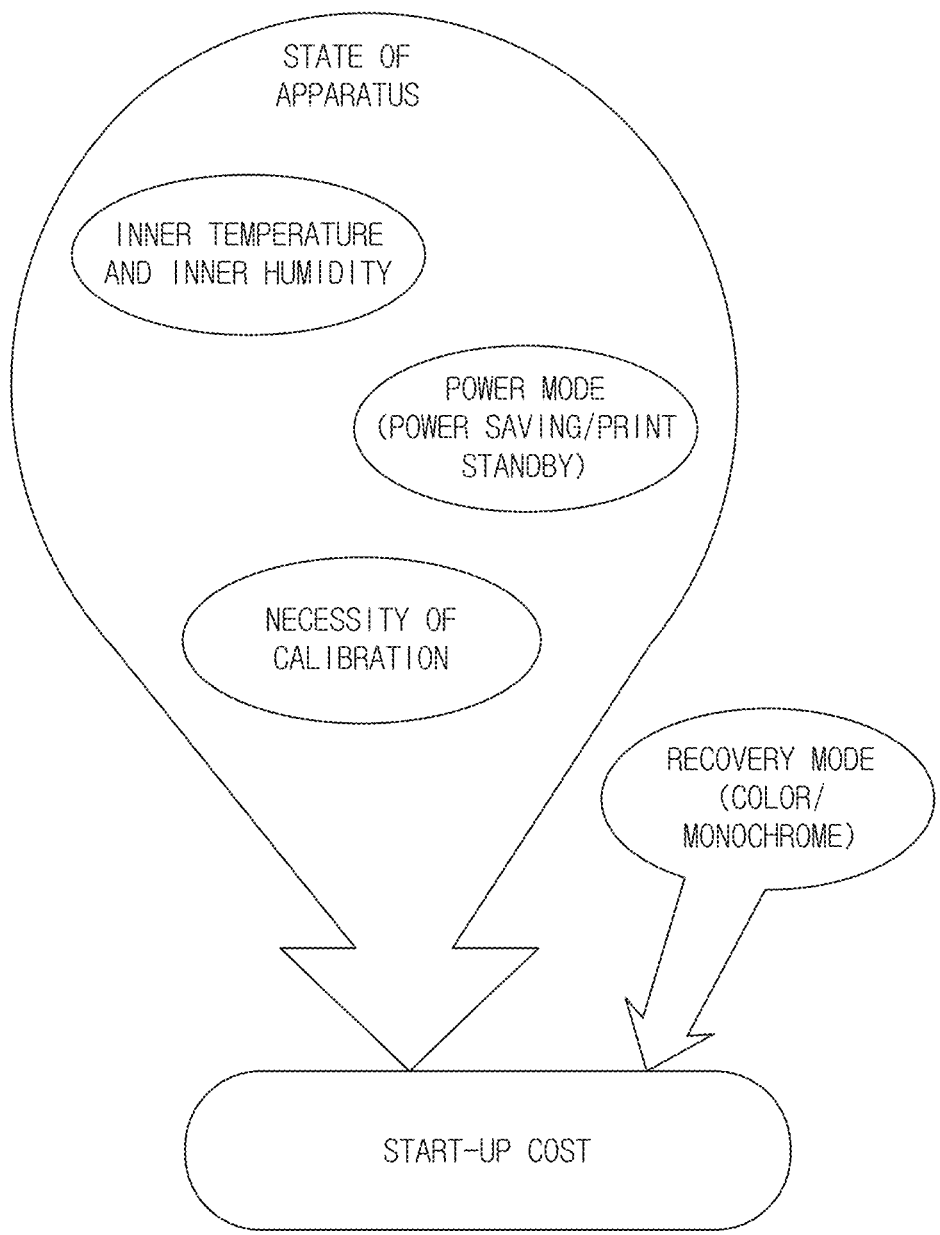
FIG. 3 is an explanatory view showing various types of factors for calculating the start-up cost.

FIG. 3 shows various types of factors for calculating the start-up cost. The start-up cost increases or decreases depending on the state of the apparatus, such as the inner temperature, the inner humidity, the power mode and the necessity of the calibration operation, and the recovery mode. The start-up cost calculation unit 32 calculates the start-up cost in accordance with the state and the recovery mode of the image forming apparatus 10.

For example, in case that the image forming apparatus 10 is started up from the power saving state, large power consumption and much start-up cost are required as compared with the case in which the image forming apparatus 10 is started up from the print standby state. Further, in case that the inner temperature is lower than a predetermined temperature, much start-up cost is required as compared to the case in which the inner temperature has been raised to the predetermined temperature. Further, as the inner temperature is lower, the power consumption required to raise the temperature of the fixing device to the intended temperature increases more and the like. As a result, the start-up cost increases. Further, in case of the state in which the calibration operation is required immediately after the start-up, the cost for the calibration operation to be executed immediately after the start-up is also included in the start-up cost.

Further, the recovery mode includes the color recovery mode in which the image forming apparatus 10 is started up to a state in which the color printing can be performed, and the monochrome recovery mode in which the image forming apparatus 10 is started up to a state in which only the monochrome printing can be performed. The start-up cost is different depending on the state to which the image forming apparatus 10 is started up. In the color recovery mode, because four image forming units having the colors of CMYK are started up, the start-up cost increases as compared to the case in which the image forming apparatus 10 is started up in the monochrome recovery mode.

As shown in FIG. 2, the total sum calculation unit 33 calculates the total sum of the investable amount of the input job and the stored jobs, which is spent for the start-up of the image forming apparatus 10. The investable amount for the start-up (also referred to simply as "investable amount") can be set for each job or for each user. For example, it is assumed that in case that the job 1 in which the investable amount is set to 2 yen and the job 2 in which the investable amount is set to 3 yen, have been stored, the job 3 in which the investable amount is set to 4 yen is input. In this case, the total sum calculation unit 33 outputs 9 yen as the total sum of the investable amount.

In the investment amount table 34, the investable amount of each user is registered. Here, in case that the investable amount of each job is set, the total sum calculation unit 33 calculates the total sum by using the set investable amount as the investable amount of the job. On the other hand, in case that the investable amount of the job is not set, the total sum calculation unit 33 relates the job to the user who inputs the job and calculates the total sum by using the investable amount registered in the investment amount table 34 as the investable amount of the job.

In case that the total sum calculated by the total sum calculation unit 33 is less than the start-up cost calculated by the start-up cost calculation unit 32, the job control unit 35 suspends the execution of the input job and instructs the hard disk drive 15 to store the job. In case that the total sum is not less than the start-up cost, the job control unit 35 instructs the printer unit 24 to collectively execute the input job and the stored jobs. Further, in case that the state of the apparatus is changed, the start-up cost calculation unit 32 calculates the start-up cost for the start-up of the image forming apparatus 10 from the changed state, and the job control unit 35 compares the start-up cost with the total sum of the investable amount of the stored jobs. In case that the total sum is not less than the start-up cost, the job control unit 35 instructs the printer unit 24 to collectively execute the stored jobs. The charging unit 36 allocates the start-up cost to each of the jobs which are collectively executed and charges each user for the start-up cost.

Next, a specific example of the operation relating to the suspension of the execution of the job and the collective execution of the jobs in the image forming apparatus 10 is shown.

Figure 4:
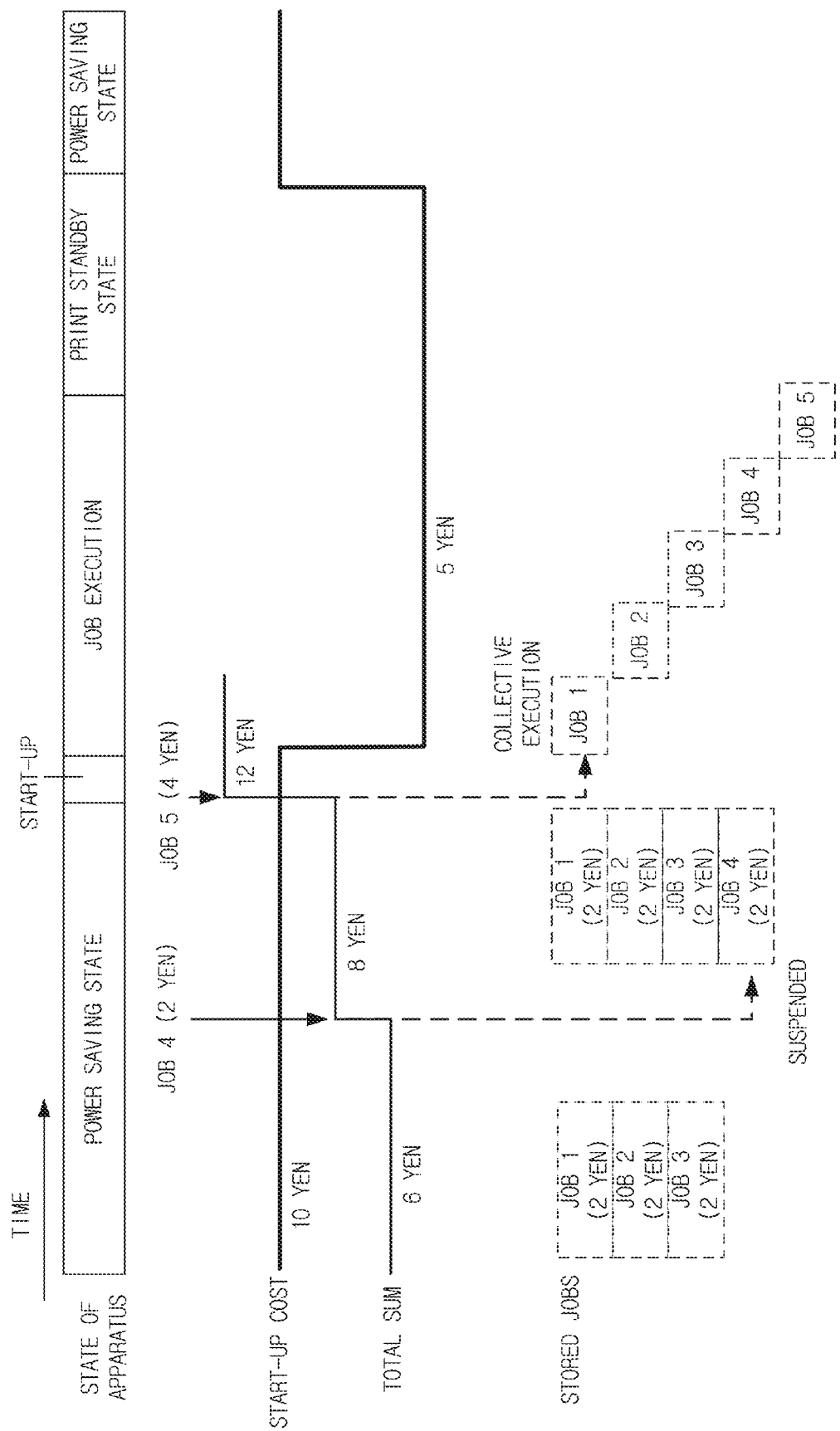
FIG. 4 is a view showing an example of the case in which the jobs are collectively executed by inputting a new job.

FIG. 4 shows an example of the case in which the jobs are collectively executed by inputting a new job. In the power saving state, the jobs 1, 2 and 3 each of which has the investable amount of 2 yen are stored. The start-up cost for starting up the image forming apparatus 10 from the power saving state is 10 yen. In this state, because the total sum of the investable amount (6 yen) is less than the start-up cost (10 yen), the jobs remain stored.

Then, the job 4 having the investable amount of 2 yen is input. As a result, the total sum of the investable amount is 8 yen. However, because the total sum is less than the start-up cost (10 yen), the execution of the job 4 is suspended and the job 4 is stored.

Then, the job 5 having the investable amount of 4 yen is input. As a result, because the total sum of the investable amount is 12 yen and is not less than the start-up cost (10 yen) the jobs 1 to 5 are collectively executed.

After the completion of the execution of the jobs 1 to 5, the image forming apparatus 10 changes to the print standby state. During the print standby state, the start-up cost is 5 yen. When the image forming apparatus 10 changes to the power saving state, the start-up cost is changed to 10 yen again.

Figure 5:
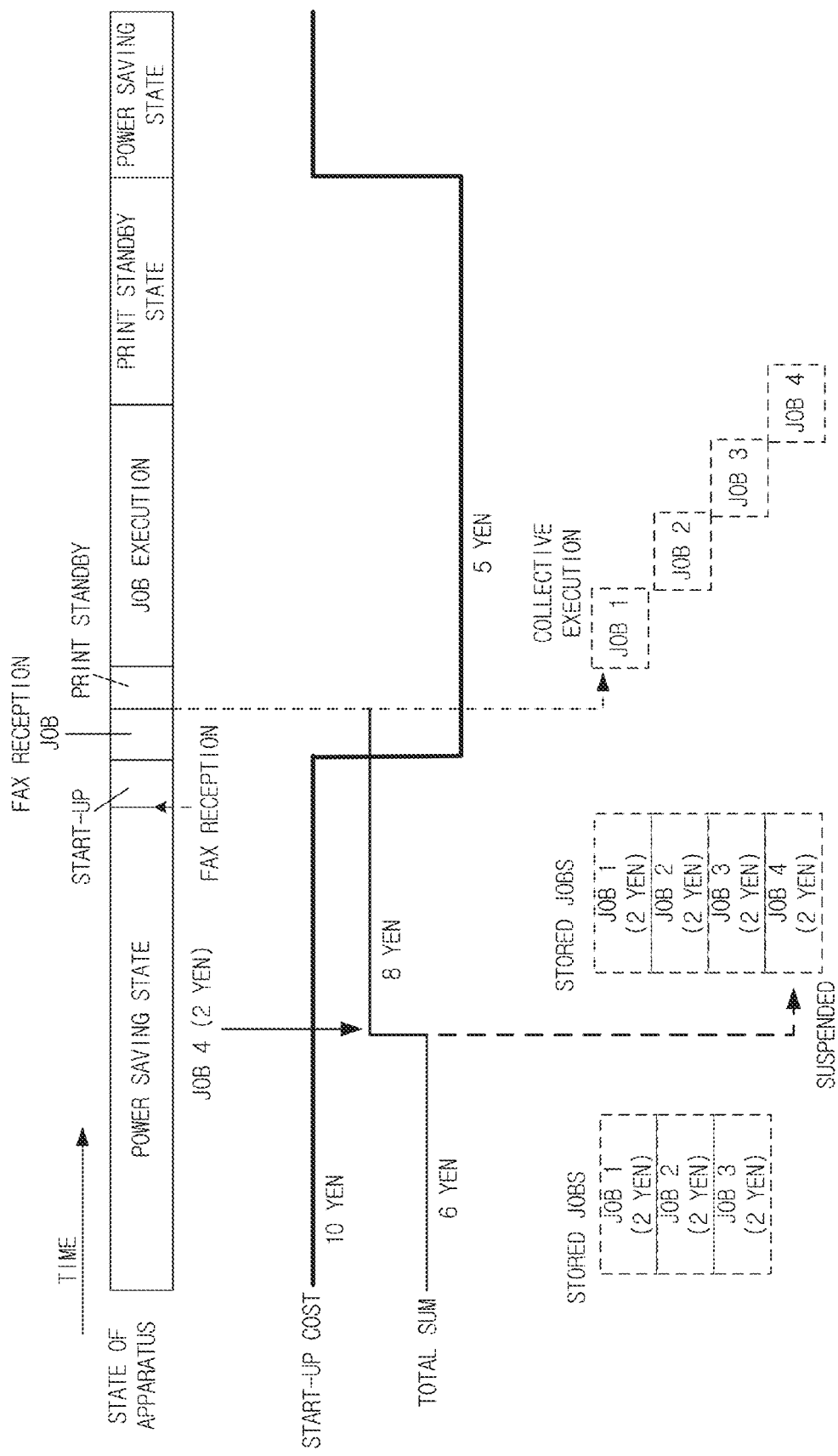
FIG. 5 is a view showing the operation which is executed in case that the state of the apparatus is changed by the FAX reception.

FIG. 5 shows an example of the operation which is executed in case that the state of the apparatus is changed by the FAX reception. The operation which is executed until the job 4 is stored is the same as that of FIG. 4. By storing the job 4, the total sum of the investable amount is 8 yen.

Then, when a FAX image is received, the image forming apparatus 10 is started up, executes the FAX reception job, and prints out the received image by the printer unit 24. After the completion of the execution of the FAX reception job, the image forming apparatus 10 changes to the print standby state. Because the start-up cost for starting up the image forming apparatus 10 from the print standby state is 5 yen, the total sum of the investable amount of the stored jobs 1 to 4 (8 yen) is not less than the start-up cost (5 yen). Accordingly, the stored jobs 1 to 4 are collectively executed after the completion of the execution of the FAX reception job.

Figure 6:
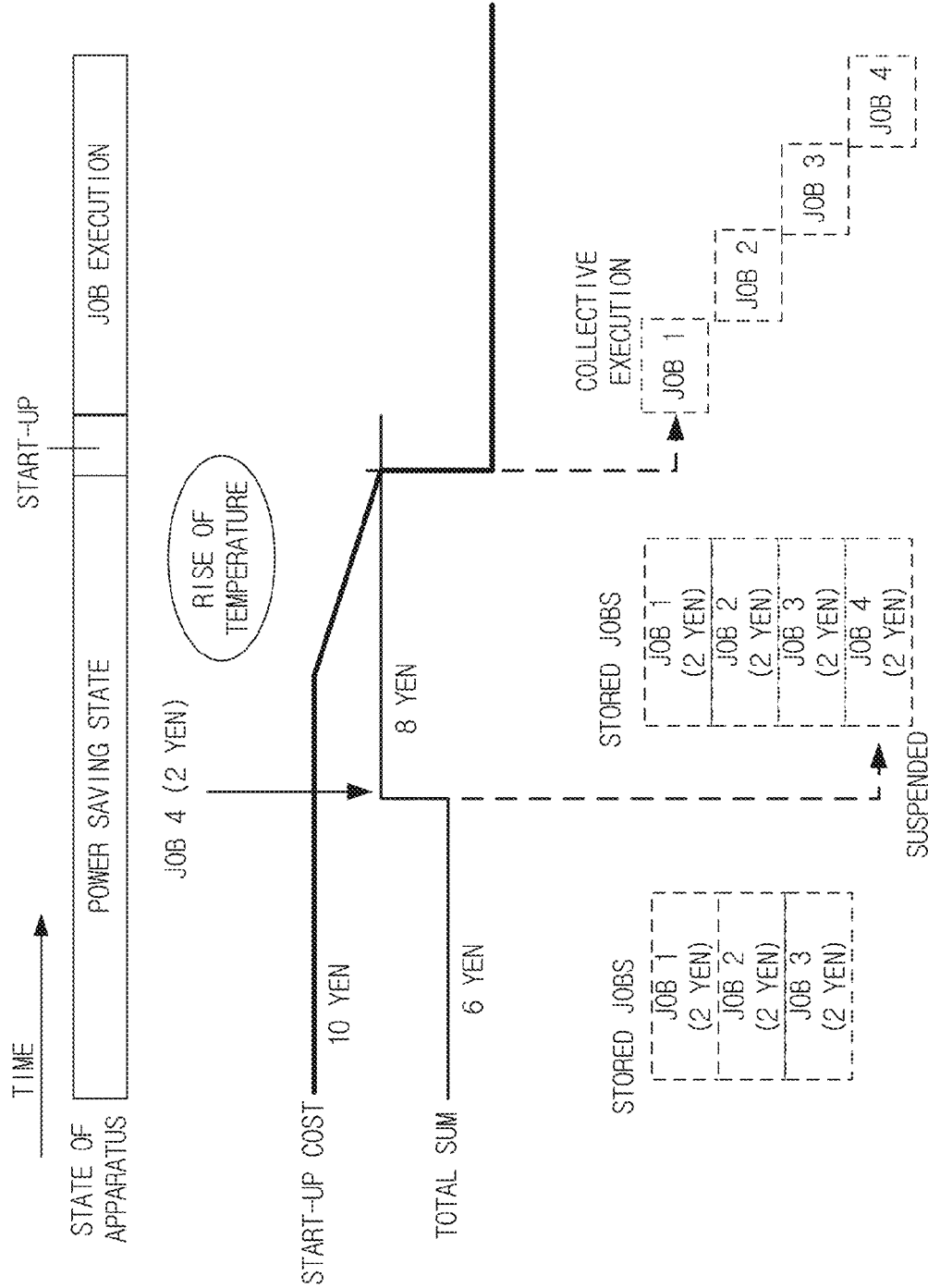
FIG. 6 is a view showing an example of the operation which is executed in case that the start-up cost is reduced by the rising of the inner temperature of the image forming apparatus.

FIG. 6 shows an example of the operation which is executed in case that the start-up cost is reduced by the rising of the inner temperature and the jobs are collectively executed. The operation which is executed until the job 4 is stored is the same as that of FIG. 4. By storing the job 4, the total sum of the investable amount is 8 yen.

Then, as the room temperature rises, the inner temperature is raised and the start-up cost is gradually reduced. When the start-up cost is reduced to 8 yen, the total sum of the investable amount of the stored jobs 1 to 4 is not less than the start-up cost, and the jobs 1 to 4 are collectively executed.

Figure 7:
FIG. 7 is a view showing an example of the investment amount table.

FIG. 7 shows an example of the investment amount table 34. A user name, the investable amount, and the current total charging amount are registered for each user. The total charging amount may be managed separately. In this embodiment, in the image forming apparatus 10, each user is charged in units of $1/100$ yen.

Next, the process relating to the suspension of the execution of the job and the collective execution of the jobs, and relating to the charging in the image forming apparatus 10 is explained in accordance with the flowcharts.

Figure 8:
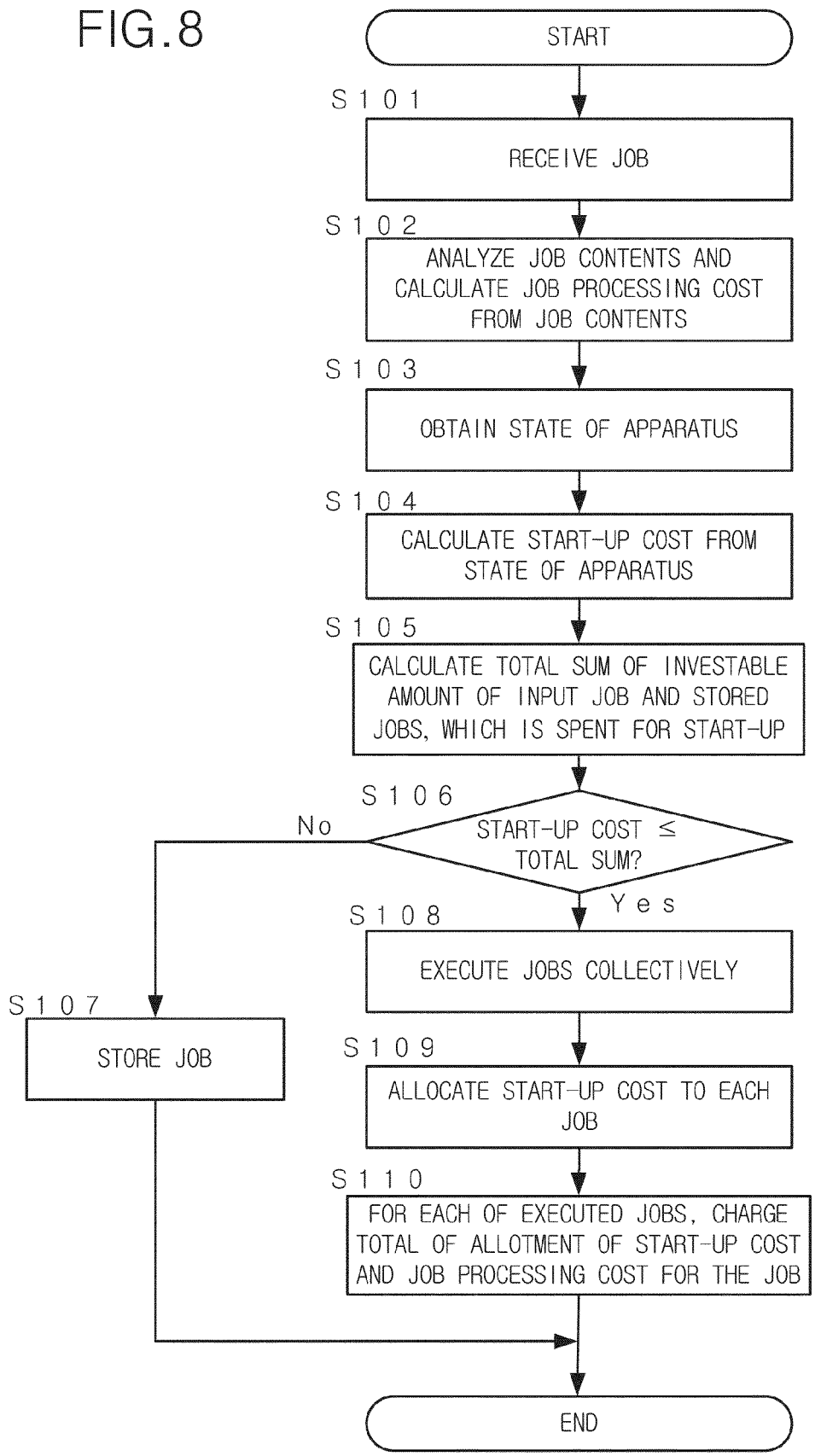
FIG. 8 is a flowchart showing the process performed by the image forming apparatus in case that the job is received.

FIG. 8 shows the process performed by the image forming apparatus 10 in case that the job is received. When the job, such as a print job, is received (Step S101), the CPU 11 of the image forming apparatus 10 analyzes the setting contents of the job and calculates the job processing cost (Step S102). At this time, the job is received via a network, a USB memory or the like, or is received by the instruction which is input from the operating unit 21.

Next, the current state of the apparatus is obtained (Step S103). That is, the information, such as the power state, the inner temperature, the inner humidity of the image forming apparatus 10, and the date on which the previous image adjustment is performed in the image forming apparatus 10, is obtained. Then, the CPU 11 of the image forming apparatus 10 calculates the cost for the start-up of the image forming apparatus 10 from the current state to the job executable state (Step S104). This cost is mainly the cost for the power consumption, however, in case that the calibration operation is performed, the cost of the toner used for a patch and the like are also included.

The start-up cost may be obtained as described below. A lookup table for outputting the start-up cost by inputting the state of the apparatus (the power mode, the inner temperature, the inner humidity and the execution of the calibration operation) and the recovery mode as parameters, is previously prepared and is stored in the nonvolatile memory 14 or the like. The start-up cost may be obtained with reference to the lookup table. In case that there is at least one job for performing the color printing among the input job and the stored jobs, the recovery mode is the color recovery mode. In case that any one of the input job and the stored jobs is not the job for performing the color printing, the recovery mode is the monochrome recovery mode.

Next, the CPU 11 of the image forming apparatus 10 calculates the total sum of the investable amount of the input job and the stored jobs (Step S105).

The CPU 11 compares the total sum with the start-up cost calculated in Step S104. In case that the start-up cost is more than the total sum (Step S106; No), the CPU 11 suspends the execution of the job which is currently input and instructs the hard disk drive 15 to store the job (Step S107). Then, the process is ended.

In case that the start-up cost is not more than the total sum (Step S106; Yes), the CPU 11 instructs the printer unit 24 to collectively (continuously) execute the input job and the stored jobs (Step S108).

Next, the CPU 11 allocates the start-up cost to each of the jobs which are collectively executed and determines the allotment of the start-up cost to each job (Step S109). For each of the jobs which are collectively executed, the CPU 11 charges the total of the allotment of the start-up cost to the job and the job processing cost for the job (Step S110). Then, the process is ended.

The charging is performed by classifying the charging amount into each user who instructs the execution of the job or each section which instructs the execution of the job. For example, the cost for executing the jobs at this time is added to the charging amount which is stored for each user or for each section, and the charging amount is updated.

Further, the job processing cost is calculated in accordance with the setting contents of each job. The setting contents of each job include the attribute relating to the color printing or the monochrome printing, the number of sheets to be used, the amount of consumable supply to be used, the amount of power to be used, and the like. In case that the setting contents of the job are specific setting contents which contribute to saving energy, the job processing cost may be reduced. For example, in case that double-side printing is selected, a certain amount is subtracted from the job processing cost.

In case that the start-up cost is more than the total sum in Step S106 (Step S106; No), the solutions may be proposed to the user and the user may select one solution.

Figure 9:
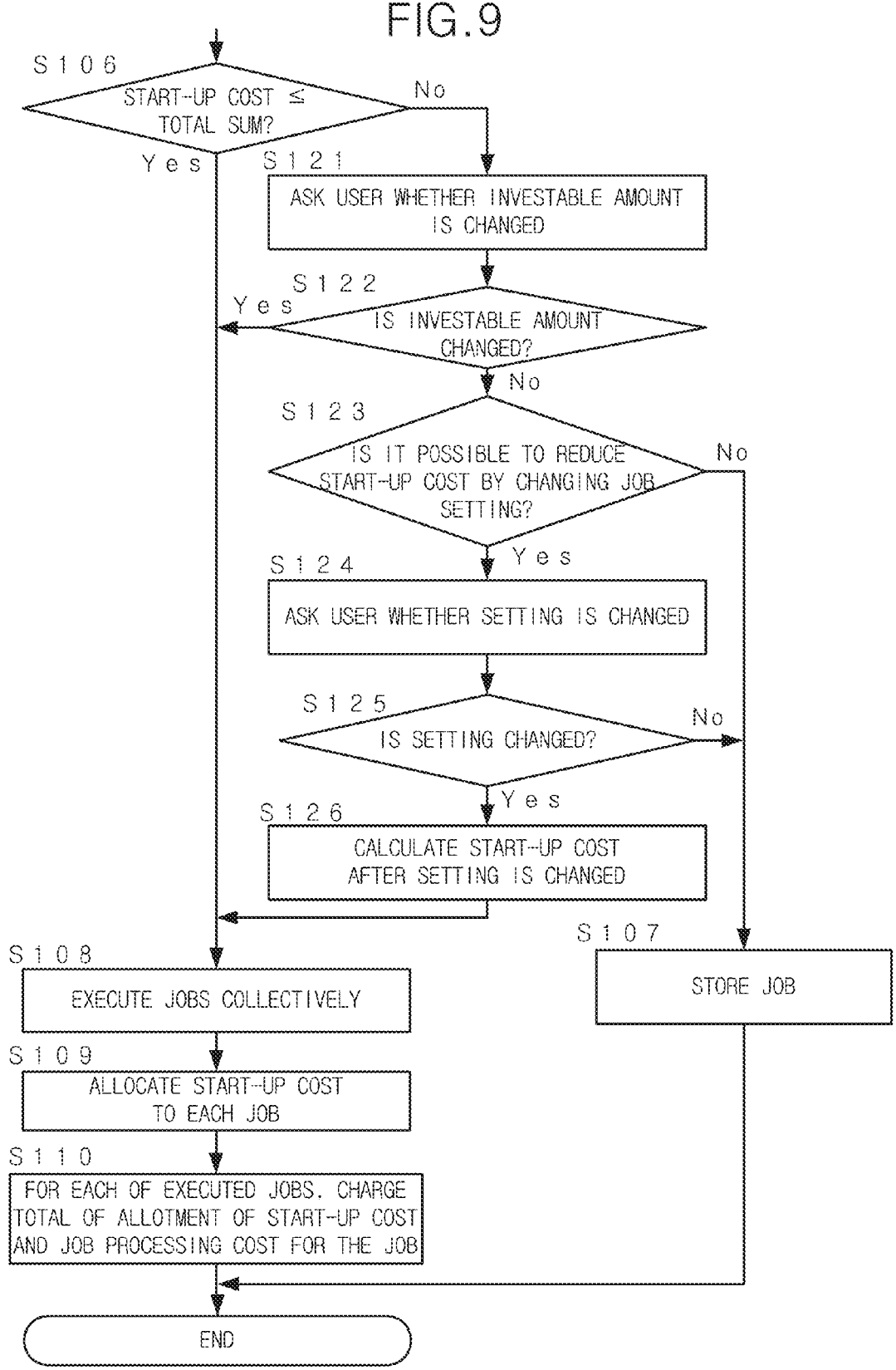
FIG. 9 is a flowchart showing the process for the case in which the solutions are proposed to a user.

FIG. 9 shows the process for the case in which the solutions are proposed to the user. The step numbers which are the same as those of FIG. 8, denote the steps which are the same as those of FIG. 8. In case that the start-up cost is more than the total sum (Step S106; No), the shortage of the total sum is shown. Further, the user is asked whether the investable amount is changed so as to eliminate the shortage (Step S121). In case that the start-up cost is not more than the total sum by changing the investable amount (Step S122; Yes), the investable amount of this job and the total sum are changed and the process proceeds to Step S108.

In case that the investable amount is not changed (Step S122; No), it is determined whether the start-up cost can be reduced by changing the setting contents of the job so that the start-up cost is not more than the total sum (Step S123). For example, when the setting contents of this job are changed from the color printing to the monochrome printing, the monochrome printing is performed in all the jobs to be collectively executed and the start-up cost is reduced.

In case that the setting contents of the job cannot be changed so that the start-up cost is not more than the total sum (Step S123; No), the process proceeds to Step S107. In case that the setting contents of the job can be changed so that the start-up cost is not more than the total sum (Step S123; Yes), the user is asked whether the setting contents are changed (Step S124).

In case that the setting contents are not changed (Step S125; No), the process proceeds to Step S107. In case that the setting contents are changed (Step S125; Yes), the start-up cost is recalculated after the setting contents are changed (Step S126), and the process proceeds to Step S108.

Note that, in case that there are a plurality of methods for reducing the start-up cost, a plurality of the methods may be proposed to the user in order to receive the selection of the method from the user. Further, also in case that the start-up cost is reduced by changing the setting contents, however, the start-up cost remains to be more than the total sum, the above reducing method may be proposed to the user in order to receive the selection as to whether the setting contents are changed or not. Further, both the option in which the investable amount is changed and the option in which the setting contents of the job are changed, are proposed to the user. Then, by combining the above options, the solution for satisfying the inequality "start-up cost≤total sum" may be selected by the user.

Figure 10:
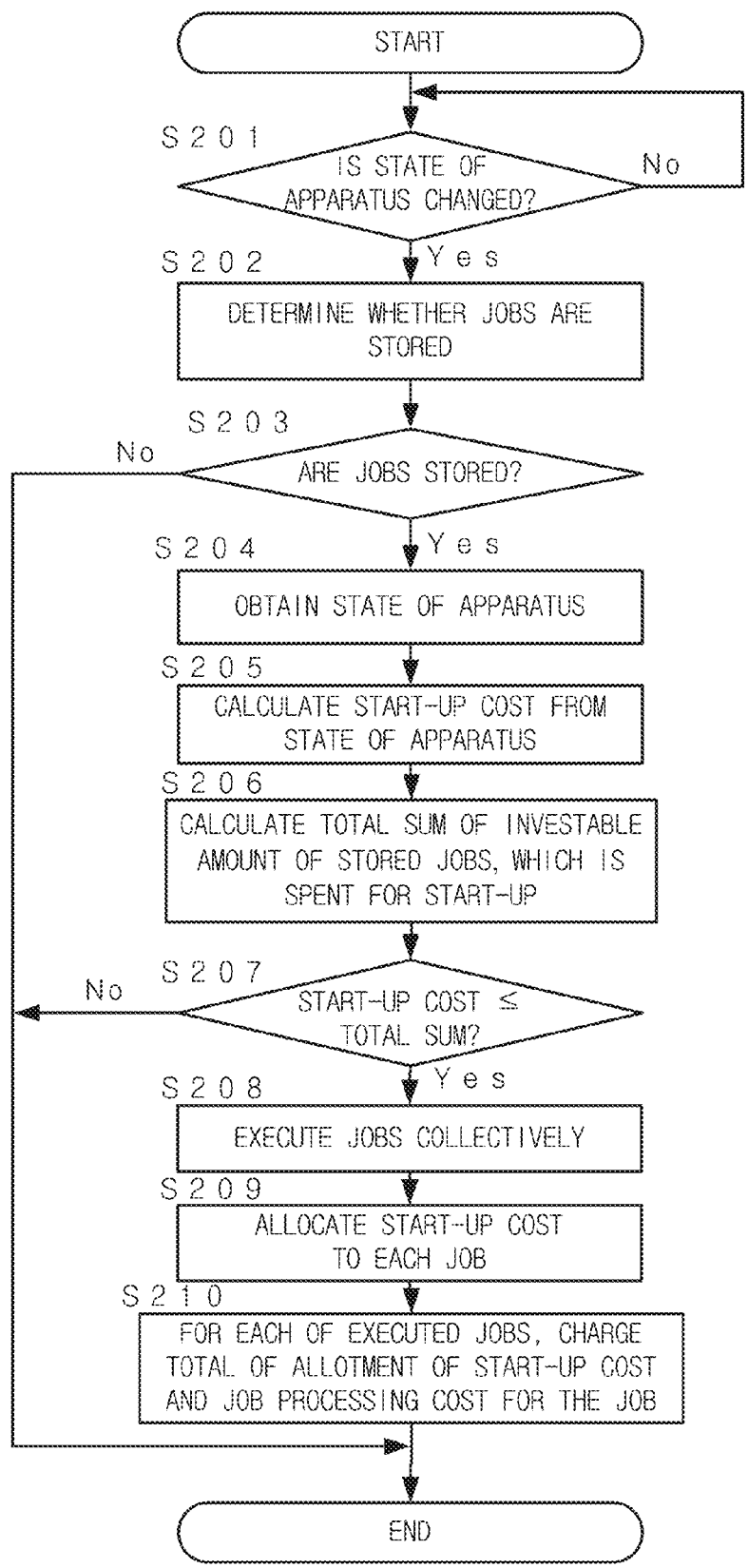
FIG. 10 is a flowchart showing the operation of the image forming apparatus at the time at which the state of the apparatus is changed.

FIG. 10 is a flowchart showing the operation of the image forming apparatus 10 at the time at which the state of the apparatus is changed. This process is repeatedly performed in the period except the period in which the job is executed and the period in the process shown in FIGS. 8 and 9 is performed by receiving the job. The image forming apparatus 10 always monitors the inner temperature and the inner humidity.

When the state of the apparatus is changed by the FAX reception or the rising of the inner temperature (Step S201; Yes), the CPU 11 of the image forming apparatus 10 determines whether the jobs are stored (Step S202). In case that the jobs are not stored in the image forming apparatus 10 (Step S203; No), the process is ended.

In case that the jobs are stored in the image forming apparatus 10 (Step S203; Yes), the current state of the apparatus is obtained (Step S204). Then, the CPU 11 of the image forming apparatus 10 calculates the cost for the start-up of the image forming apparatus 10 to the job executable state from the apparatus state of the present time in the same manner as in Step S104 (Step S205).

Next, the CPU 11 of the image forming apparatus 10 calculates the total sum of the investable amount of the stored jobs (Step S206). The CPU 11 compares this total sum and the start-up cost calculated in Step S205. In case that the start-up cost is more than the total sum (Step S207; No), the process is ended. Further, the start-up cost and the total sum may be displayed on the display unit 22, or the like, to show them to the user.

In case that the start-up cost is not more than the total sum (Step S207; Yes), the CPU 11 instructs the printer unit 24 to collectively (continuously) execute the stored jobs (Step S208). Next, the CPU 11 allocates the start-up cost to each of the jobs which are collectively executed and determines the allotment to each job (Step S209). Then, for each of the jobs which are collectively executed, the CPU 11 charges the total of the allotment to the job and the job processing cost for the job (Step S210), and the process is ended.

Figure 12:
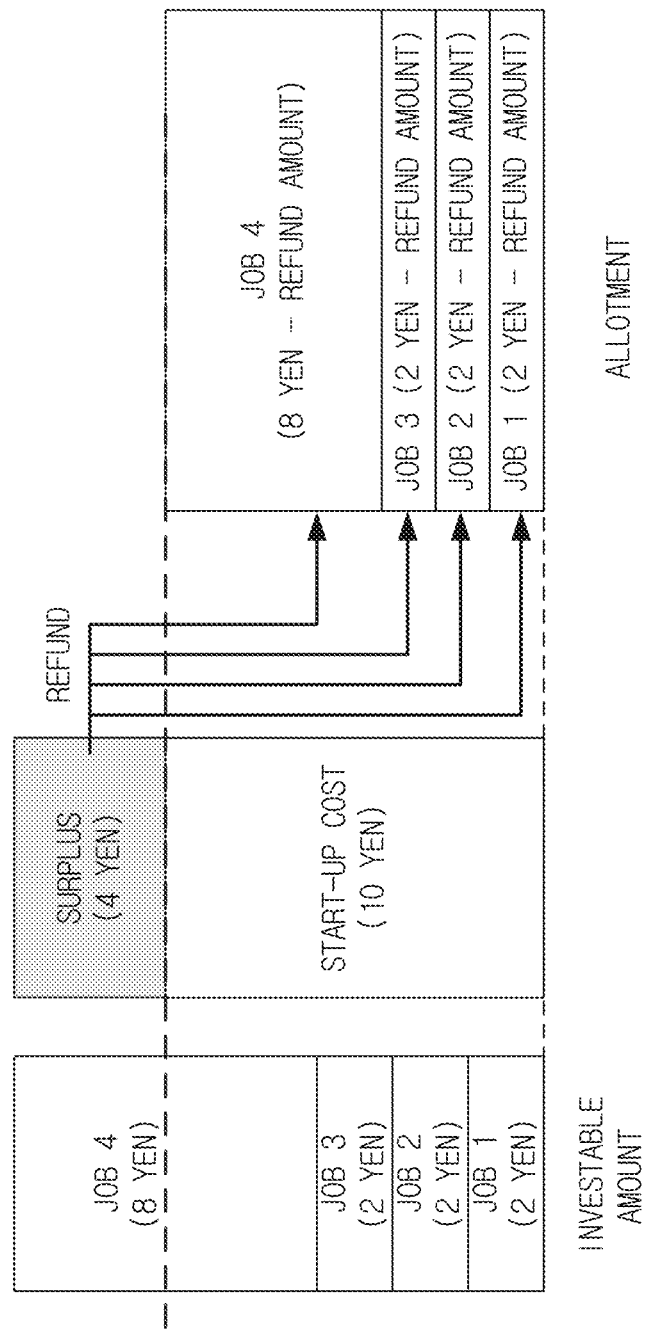
FIG. 12 is an explanatory view showing an example of the situation in which the start-up cost is allocated to each job in case that the surplus is left.

FIGS. 11 and 12 show an example of the situation in which the start-up cost is allocated to each job. Basically, the start-up cost is charged for each job in accordance with the investable amount of each job. That is, as shown in FIG. 11, in case that the total sum of the investable amount of the jobs which are collectively executed is equal to the start-up cost, the amount which is equal to the investable amount of each job is charged to each job.

In FIG. 12, the total sum of the investable amount of the jobs which are collectively executed is 14 yen, and the start-up cost is 10 yen. Therefore, the surplus of 4 yen is left. In case that the surplus is left, the image forming apparatus 10 allocates the surplus to each of the collectively-executed jobs and reduces the surplus thereto.

In the refund of the surplus, an unbiased method may be preferable. For example, the refund amount of the surplus is determined in accordance with the investable amount of each job. That is, the refund amount is set so as to refund larger surplus to the job having larger investable amount.

In addition, the refund amount is determined in accordance with the period in which the job is stored. Specifically, the surplus is preferentially refunded to the job in which the execution is suspended for a long time.

The refund amount to each job is set so as not exceed the investable amount of the job.

Figure 13:
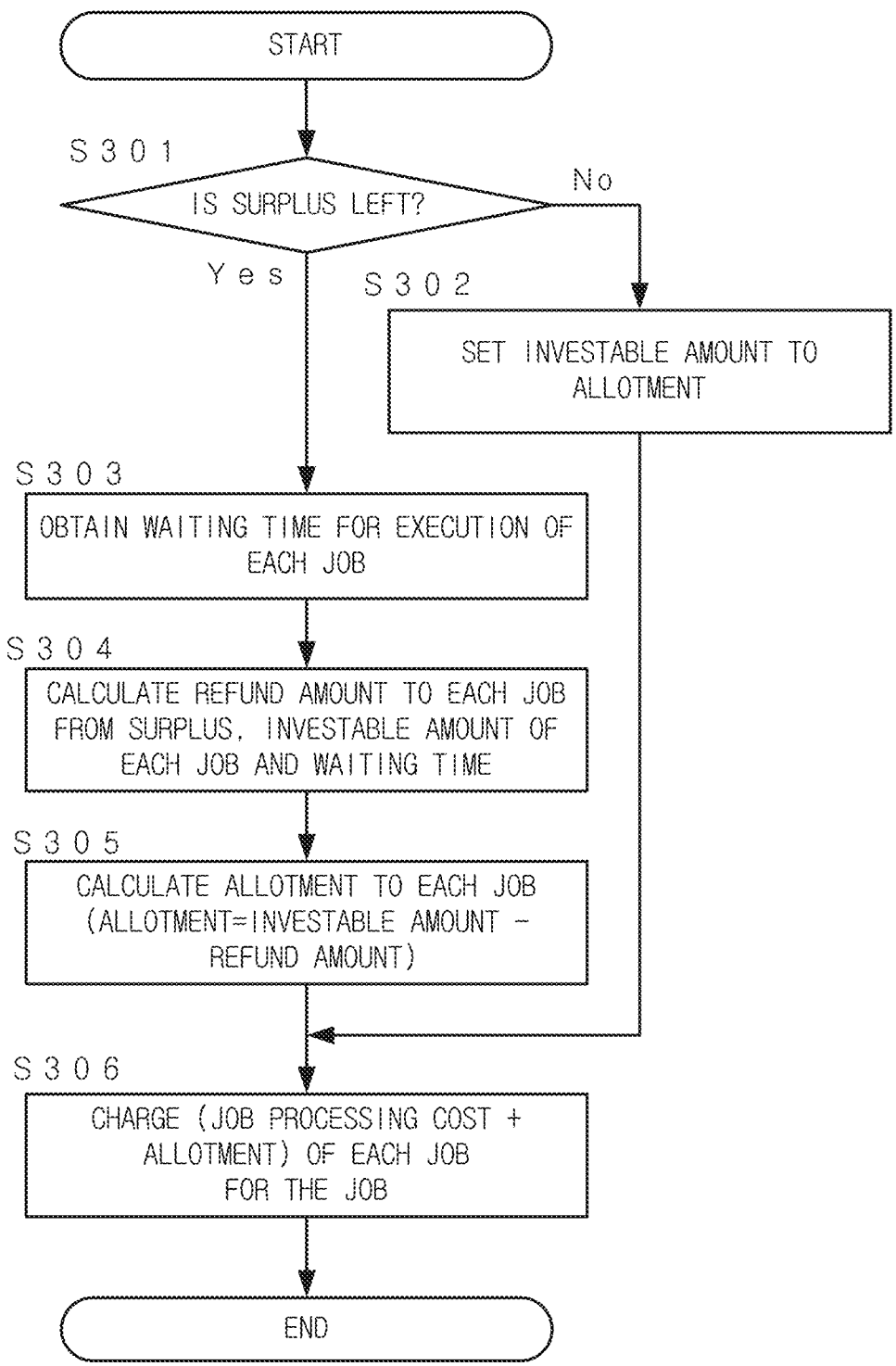
FIG. 13 is a flowchart showing the process for calculating the charging amount for each job.

FIG. 13 is a flowchart showing the process for calculating the charging amount for each job. The CPU 11 of the image forming apparatus 10 confirms whether the surplus is left (Step S301). In case that the surplus is not left (Step S301; No), the investable amount which is set in each job is set to the allotment of the start-up cost to each job (Step S302), and the process proceeds to Step S306.

In case that the surplus is left (Step S301; Yes), the waiting time for the execution of each of the jobs which are collectively executed (the time period in which the job is stored) is obtained (Step S303). Then, the refund amount to each job is determined in accordance with the surplus, the investable amount of each job, and the waiting time for execution of each job (Step S304). An example of the method for determining the refund amount will be explained below.

Next, for each job, the amount obtained by subtracting the refund amount to the job from the investable amount of the job is calculated as the allotment of the start-up cost to the job (Step S305).

Then, for each job, the total of the job processing cost for the job and the allotment of the start-up cost to the job is charged (Step S306), and the process is ended.

FIG. 14 shows an example of the method for determining the refund amount. In this method, by considering both of the waiting time and the investable amount, the refund amount is determined. A ratio table 50 of FIG. 14 shows an example of the relationship between the waiting time and the refund ratio in case of the identical investable amount. The waiting time is classified into seven sections in units of ten minutes.

According to the ratio table 50, in case that the waiting time Tw is less than 10 minutes, the ratio E is set to 1. In case that the waiting time Tw is not less than 10 minutes but less than 20 minutes, the ratio E is set to 1.2. In case that the waiting time Tw is not less than 20 minutes but less than 30 minutes, the ratio E is set to 1.4 . . . . In case that the waiting time Tw is not less than 50 minutes but less than 60 minutes, the ratio E is set to 2.0. In case that the waiting time Tw is not less than 60 minutes, the ratio E is set to 2.2.

Next, the total ratio is calculated as follows. The product of the ratio E set in each section of the waiting time and the number of jobs having each wait time classified into this section, is calculated. Then, all of the calculated products for all the sections of the waiting time are summed as the total ratio. Next, in case that the ratio set in the section into which the waiting time for the execution of an arbitrary job n is classified, is represented by En, the refund ratio Kn for each job is calculated by using the equation: Kn=En/(total ratio).

When the number of the jobs which are collectively executed is m, the investable amount of an arbitrary job n is Cn, and the unit refund amount is A, A is calculated by the following equation:

$$A = \text{surplus}/(C1 \times (\text{refund ratio } K1) + C2 \times (\text{refund ratio } K2) + \ldots + Cm \times (\text{refund ratio } Km)),\text{ and}$$

the refund amount to the job n is calculated by the following equation:

$$\text{Refund amount to job } n = Cn \times (\text{refund ratio } Kn) \times A.$$

FIG. 15 shows an example of the calculation contents in case that the refund amount to each job shown in FIG. 12 is calculated by using the method of FIG. 14. The start-up cost allocated to each job is determined according to the investable amount of the job and the waiting time for the execution of the job. Further, the refund amount to each job is set so as not exceed the investable amount of the job.

As described above, in the image forming apparatus 10 according to the embodiment, both of the job processing cost which is the charging amount based on the setting contents of the job (the setting of the number of sheets used for the printing, the setting of color/monochrome, and the like), and the start-up cost which is the cost for the start-up of the image forming apparatus 10 can be charged for the jobs.

Further, when the investable amount to beset is reduced, the execution of the job is suspended and the execution starting timing becomes late. However, the start-up cost can be reduced. As a result, the user can be motivated to contribute to the saving energy by collectively executing the jobs subsequently. On the other hand, by increasing the investable amount to be set, the user can instructs the image forming apparatus 10 to execute the input job immediately or after the relatively short waiting time elapses.

Further, because the start-up cost is calculated in accordance with the state of the apparatus, the suitable start-up cost can be charged as compared with the case in which the uniform start-up cost is set.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In the above embodiment, the image forming apparatus 10 is explained as a multifunctional apparatus. However, the present invention is applied also to other types of apparatus, such as a copier and a printer. Further, the job to be executed is not limited to a job for performing the printing, and an apparatus which executes jobs other than the job for performing the printing, may be used.

In the above embodiment, the image forming apparatus 10 having the charging function is explained. However, the charging management device which does not have the function of executing the job or the function of storing the jobs, and which only has a portion for controlling the charging, the suspension of the execution of the job and the collective execution of the jobs, may be used.

Figure 16:
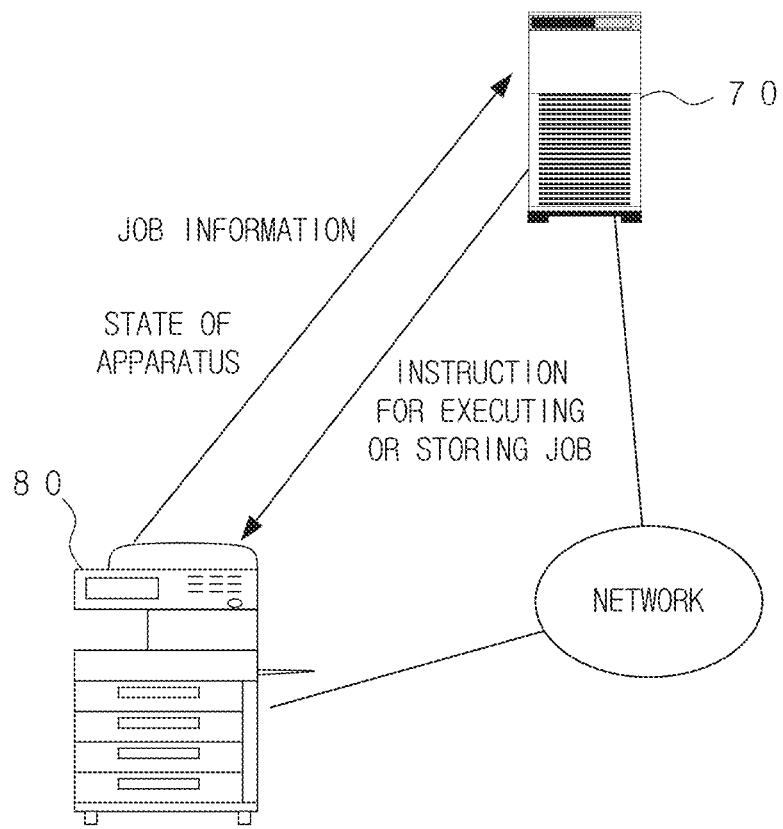
FIG. 16 is a view showing an example of the system in which the charging management device and the job processing apparatus are connected via a network.

FIG. 16 shows an example of the system in which the charging management device 70 and the job processing apparatus 80, such as the image forming apparatus, are connected via a network. The charging management device 70 obtains the information relating to the job which is input to the job processing apparatus 80, the information relating to the jobs which have been stored, and the information indicating the state of the job processing apparatus 80, from the job processing apparatus 80. Further, the charging management device 70 calculates the start-up cost and the total sum of the investable amount, determines whether the jobs are collectively executed, and transmits the result of the above determination to the job processing apparatus 80 via the network.

The job processing apparatus 80 suspends the execution of the job or collectively executes the jobs in accordance with the instruction from the charging management device 70. The job processing apparatus 80 notifies the charging management device 70 of the result of the execution of the jobs. Then, for each of the executed jobs, the charging management device 70 charges the total the allotment of the start-up cost and the job processing cost. For example, the function of the charging management device 70 is realized by the information processing apparatus which executes a predetermined program.

In addition, the charging management device 70 may functions as a print server, and may receive the input of the job to be executed by the job processing apparatus 80 from a PC. When the job is input, the charging management device 70 may perform the process shown in FIGS. 8 and 9.

One of the objects of the above embodiment is to provide the image forming apparatus, the charging management device and the non-transitory computer-readable recording medium which can charge the start-up cost for the start-up of the apparatus for the jobs, and can determine whether the input job is immediately executed or the execution of the input job is suspended and the jobs are collectively executed subsequently in accordance with the above charge.

In the above embodiment, when the job is input, the start-up cost for the start-up of the image forming apparatus from the current state of the apparatus to the state in which the job can be executed, is calculated. Further, the total sum of the investable amount of the input job and the stored jobs, which is spent for the start-up of the image forming apparatus 10, is calculated. In case that the total sum is less than the start-up cost, the input job is stored. In case that the total sum is not less than the start-up cost, the input job and the stored jobs are collectively executed. Further, the start-up cost is allocated to each of the jobs which are collectively executed, and the allocated start-up cost is charged for each job.

In the above embodiment, when the state of the image forming apparatus is changed due to the change in the temperature, the reception of the FAX job, or the like, the start-up cost for the start-up from the changed state is recalculated. The total sum of the investable amount of the stored jobs, which is spent for the start-up cost is compared with the recalculated start-up cost and it is determined whether the stored jobs are collectively executed.

In the above embodiment, the investable amount which is spent for the start-up cost can be set for each user or for each job. In case that the investable amount is set low, the execution of the job tends to be suspended and the job is easily stored. On the other hand, in case that the investable amount is set high, the execution of the job tends not to be suspended. For example, when the investable amount of one job is not less than the start-up cost, the job is necessarily executed immediately.

In the above embodiment, for example, the start-up cost is allocated to each of the jobs at the rate which is determined according to the set investable amount.

In above embodiment, for example, as the period in which the job is stored is longer, the allotment of the start-up cost is reduced more.

In the above embodiment, in case that the start-up cost exceeds the total sum and the execution of the job is suspended, a user can instructs the image forming apparatus to immediately execute the job by selecting a predetermined solution.

In the above embodiment, when the job is input, the start-up cost for the start-up of the predetermined job execution apparatus which executes the input job from the current state of the apparatus to the state in which the job can be executed, and the total sum of the investable amount of the input job and the stored jobs, which is spent for the start-up cost of the job execution apparatus, are calculated. In case that the total sum is less than the start-up cost, the input job is stored in the predetermined job storing unit. In case that the total sum is not less than the start-up cost, the charging management device instructs the job execution apparatus to collectively execute the input job and the stored jobs. Further, the start-up cost is allocated to each of the jobs which are collectively executed, and the allocated start-up cost is charged for each job.

In the above embodiment, when the state of the job execution apparatus is changed due to the change in inner temperature of the job execution apparatus, the reception of the FAX job, or the like, the start-up cost for the start-up from the changed state is recalculated. The total sum of the investable amount of the stored jobs, which is spent for the start-up cost is compared with the recalculated start-up cost and it is determined whether the stored jobs are collectively executed.

In the above embodiment, the investable amount which is spent for the start-up cost can be set for each user or for each job. In case that the investable amount is set low, the execution of the job tends to be suspended and the job is easily stored. On the other hand, in case that the investable amount is set high, the execution of the job tends not to be suspended. For example, when the investable amount of one job is not less than the start-up cost, the job is necessarily executed immediately.

In the above embodiment, for example, the start-up cost is allocated to each of the jobs at the rate which is determined according to the set investable amount.

In above embodiment, for example, as the period in which the job is stored is longer, the allotment of the start-up cost is reduced more.

In the above embodiment, in case that the start-up cost exceeds the total sum and the execution of the job is suspended, a user can instructs the job execution apparatus to immediately execute the job by selecting a predetermined solution.

According to the image forming apparatus, the charging management device and the non-transitory computer-readable recording medium in the above embodiment, the start-up cost for the start-up of the apparatus can be charged for the jobs and it is possible to determine whether the input job is immediately executed or the execution of the input job is suspended and the jobs are collectively executed subsequently in accordance with the above charge.

Although the present invention has been described and illustrated in detail, it is clearly understood that the same is by way of illustrated and example only and is not to be taken by way of limitation, the scope of the present invention being interpreted by terms of the appended claims.

The present U.S. patent application claims the priority of Japanese Patent Application No. 2013-163330, filed on Aug. 6, 2013, according to the Paris Convention, and the entirety of which is incorporated herein by reference for correction of incorrect translation.

What is claimed is:

1. An image forming apparatus comprising:
 a job input unit configured to receive an input of a job;
 a job execution unit configured to execute the job;
 a job storing unit configured to store the job of which execution is suspended;
 a start-up cost calculation unit configured to calculate a start-up cost which is a cost for start-up of the image forming apparatus from a state in which the job is input to a state in which the job can be executed, when the job is input from the job input unit;
 a total sum calculation unit configured to calculate a total sum of investable amount of the input job and one or more jobs stored in the job storing unit, which is spent for the start-up of the image forming apparatus;
 a job control unit configured to instruct the job storing unit to store the input job in case that the total sum is less than the start-up cost, and instruct the job execution unit to collectively execute the input job and the jobs stored in the job storing unit in case that the total sum is not less than the start-up cost; and
 a charging unit configured to allocate the start-up cost to the jobs which are collectively executed, and charge the allocated start-up cost for each executed job.

2. The image forming apparatus of claim 1, wherein
 in case that a state of the image forming apparatus is changed,
 the start-up cost calculation unit calculates the start-up cost for the start-up of the image forming apparatus from the changed state to the state in which the job can be executed, and
 the total sum calculation unit calculates the total sum of the investable amount of the jobs stored in the job storing unit, which is spent for the start-up of the image forming apparatus; and
 in case that the start-up cost is not more than the total sum,
 the job control unit instructs the job execution unit to collectively execute the jobs stored in the job storing unit, and
 the charging unit allocates the start-up cost to the jobs which are collectively executed, and charges the allocated start-up cost for each executed job.

3. The image forming apparatus of claim 1, wherein
 a state of the image forming apparatus includes a state relating to power saving.

4. The image forming apparatus of claim 1, wherein
a state of the image forming apparatus includes at least one of a temperature of the image forming apparatus and a humidity of the image forming apparatus.

5. The image forming apparatus of claim 1, wherein
the job execution unit can execute a job for forming an image on a recording sheet,
a state of the image forming apparatus includes a necessity of a calibration operation to be executed after the start-up, and
the start-up cost includes a cost for the calibration operation which is executed after the start-up.

6. The image forming apparatus of claim 1, wherein
the investable amount of each job, which is spent for the start-up is an amount set for each user or for each job.

7. The image forming apparatus of claim 6, wherein
the charging unit determines an allotment of the start-up cost to each of the jobs which are collectively executed, by considering the set amount.

8. The image forming apparatus of claim 1, wherein
the charging unit determines an allotment of the start-up cost to each of the jobs which are collectively executed, by considering a period in which the job is stored.

9. The image forming apparatus of claim 1, wherein
in case that the start-up cost is more than the total sum, one or more solutions for setting the start-up cost so as to be not more than to the total sum, are proposed to a user and a selection of the solution to be adopted is received from the user.

10. A non-transitory computer-readable recording medium storing a program, wherein the program causes an image forming apparatus to function as the image forming apparatus of claim 1.

11. A charging management device comprising:
a start-up cost calculation unit configured to calculate a start-up cost which is a cost for start-up of a predetermined job execution apparatus from a current state of the job execution apparatus to a state in which a job can be executed by the job execution apparatus, when the job is input;
a total sum calculation unit configured to calculate a total sum of investable amount of the input job and one or more jobs stored in a predetermined job storing unit to suspend execution of the jobs, which is spent for the start-up of the job execution apparatus;
a job control unit configured to instruct the job storing unit to store the input job in case that the total sum is less than the start-up cost, and instruct the job execution apparatus to collectively execute the input job and the jobs stored in the job storing unit in case that the total sum is not less than the start-up cost; and
a charging unit configured to allocate the start-up cost to the jobs which are collectively executed, and charge the allocated start-up cost for each executed job.

12. The charging management device of claim 11, wherein
in case that a state of the job execution apparatus is changed,
the start-up cost calculation unit calculates the start-up cost for the start up of the job execution apparatus from the changed state to the state in which the job can be executed, and
the total sum calculation unit calculates the total sum of the investable amount of the jobs stored in the job storing unit to suspend execution of the jobs, which is spent for the start-up of the job execution apparatus; and
in case that the start-up cost is not more than the total sum,
the job control unit instructs the job execution apparatus to collectively execute the jobs stored in the job storing unit, and
the charging unit allocates the start-up cost to the jobs which are collectively executed, and charges the allocated start-up cost for each executed job.

13. The charging management device of claim 11, wherein
a state of the job execution apparatus includes a state relating to power saving.

14. The charging management device of claim 11, wherein
a state of the job execution apparatus includes at least one of a temperature of the job execution apparatus and a humidity of the job execution apparatus.

15. The charging management device of claim 11, wherein
the job execution apparatus is an apparatus which executes a job for forming an image on a recording sheet,
a state of the job execution apparatus includes a necessity of a calibration operation to be executed after the start-up, and
the start-up cost includes a cost for the calibration operation which is executed after the start-up.

16. The charging management device of claim 11, wherein
the investable amount of each job, which is spent for the start-up of the job execution apparatus, is an amount set for each user or for each job.

17. The charging management device of claim 16, wherein
the charging unit determines an allotment of the start-up cost to each of the jobs which are collectively executed, by considering the set amount.

18. The charging management device of claim 11, wherein
the charging unit determines an allotment of the start-up cost to each of the jobs which are collectively executed, by considering a period in which the job is stored.

19. The charging management device of claim 11, wherein
in case that the start-up cost is more than the total sum, one or more solutions for setting the start-up cost so as to be not more than to the total sum, are proposed to a user and a selection of the solution to be adopted is received from the user.

20. A non-transitory computer-readable recording medium storing a program, wherein the program causes an information processing apparatus to function as the charging management device of claim 11.

* * * * *